H. L. J. WATCHORN, G. H. ROBERTS AND M. RAKER.
SAFETY ATTACHMENT TO TRACTORS.
APPLICATION FILED DEC. 9, 1919.
1,373,691.
Patented Apr. 5, 1921.
2 SHEETS—SHEET 1.
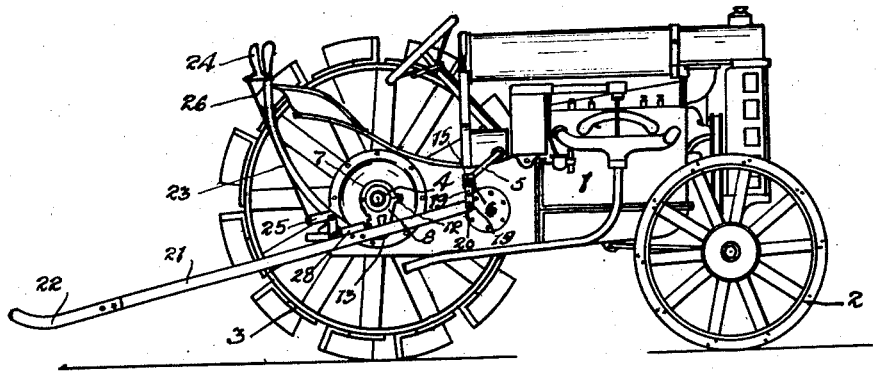
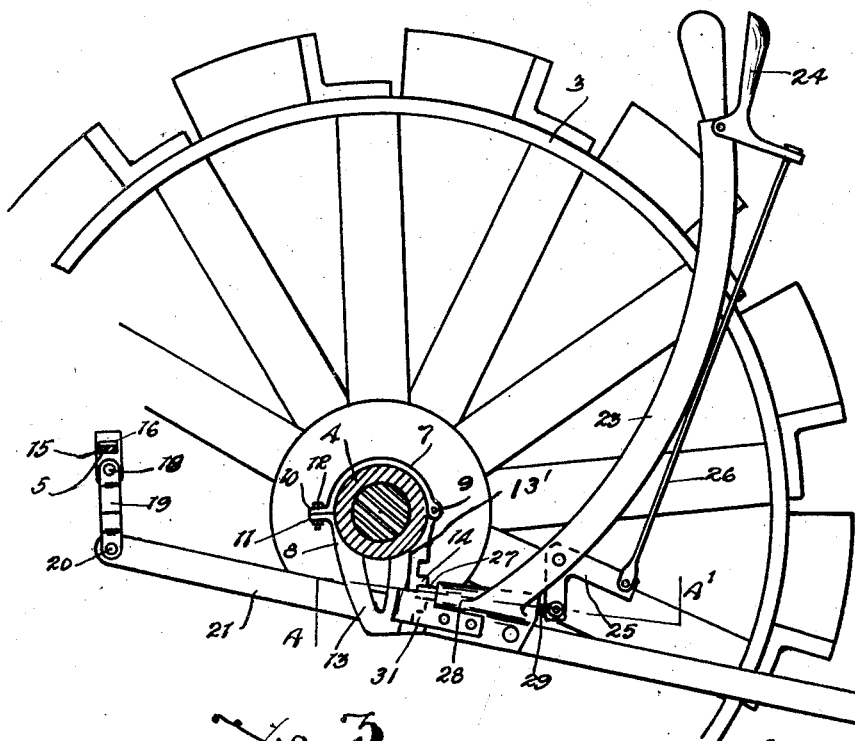

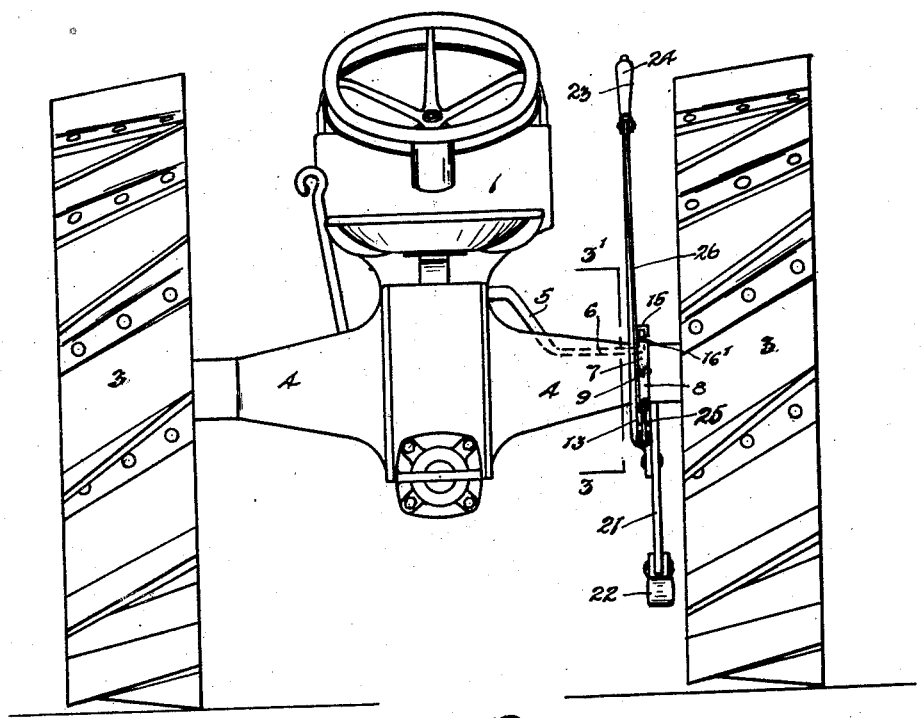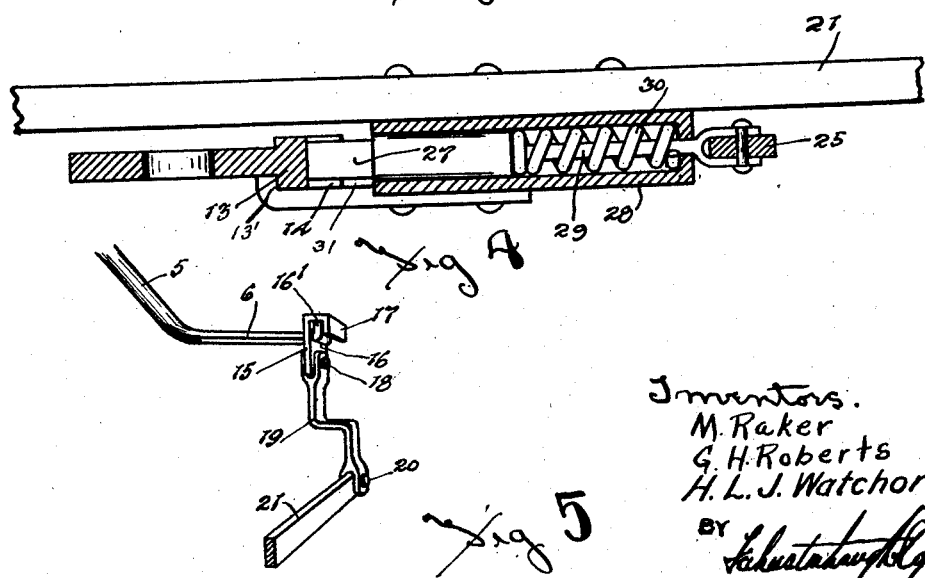

UNITED STATES PATENT OFFICE.

HARRY LEE JACKSON WATCHORN, GEORGE HADLEY ROBERTS, AND MICHAEL RAKER, OF COUTTS, ALBERTA, CANADA.

SAFETY ATTACHMENT TO TRACTORS.

1,373,691.　　　　　Specification of Letters Patent.　　Patented Apr. 5, 1921.

Application filed December 9, 1919. Serial No. 343,504.

*To all whom it may concern:*

Be it known that we, HARRY LEE JACKSON WATCHORN, GEORGE HADLEY ROBERTS, and MICHAEL RAKER, all of the town of Coutts, in the Province of Alberta, Canada, have jointly invented certain new and useful Improvements in Safety Attachments to Tractors, of which the following is the specification.

The invention relates to improvements in safety attachments to tractors and the principal object of the invention is to provide an attachment which will automatically throw the clutch controlling pedal of a tractor to disengage the clutch should the tractor attempt to upset rearwardly and by so doing positively prevent rearward upsetting and the resultant damage and possible accident which might occur.

A further object is to arrange the attachment so that it can be adjusted to suit conditions and give, so to speak, a reasonable factor of safety.

With the above objects in view the invention consists essentially in the arrangement and construction of parts hereinafter more particularly described and later pointed out in the appended claims, reference being had to the accompanying drawing in which:—

Figure 1 is a side view of a tractor with our invention applied thereon and the nearest rear traction wheel removed.

Fig. 2 is an enlarged rear view of the attachment.

Fig. 3 is a sectional view at 3—3′ Fig. 2.

Fig. 4 is a perspective view of the connecting clip.

Fig. 5 is an enlarged detailed horizontal sectional view through the quadrant at 4—4′ Fig. 3.

In the drawing like characters of reference indicate corresponding parts in the several figures.

We have herein shown our invention as applied on a tractor known as the Fordson tractor and as this machine is now on the market and well known we have not considered it necessary to enter into the details of the numerous parts of the tractor but have restricted our description to the particular parts with which our invention is associated.

The tractor engine 1 is carried as is usual by front steering wheels 2 and rear traction wheels 3. 4 represents the rear axle housing and 5 the clutch pedal which extends rearwardly from the right hand side of the tractor and is fitted with a foot rest 6 for operating purposes. This pedal controls the clutch and its downward movement releases the clutch, thus disconnecting the motor from the driving gears. The arrangement of the clutch and gears is not herein described as their action forms no part of this invention, it being sufficient for this disclosure to understand that the down movement of the pedal serves the purpose of throwing the clutch and throwing the motor out of action.

To the rear axle housing in a location to the rear of the clutch pedal we clamp a split band or ring embodying an upper half 7 and a lower half 8 pivotally connected together at 9 and provided at their forward ends with extending lugs 10 and 11 through which a bolt 12 is passed. This arrangement allows of the easy placing of the band on the housing and the fastening of it by tightening the bolt. The under half of the band carries a downwardly extending quadrant 13 presenting the customary teeth 14. The quadrant is provided with an arcuate shoulder 13′ for a purpose later disclosed.

To the rear end of the clutch pedal we attach a connecting clip 15, the clip being provided with a rectangular opening 16 which receives the end of the pedal which it will be observed is fitted with an upturned end 16′. The upper end of the clip is provided with an overhanging extension 17 which rests on the upturned end of the pedal.

To the lower end of the clip we attach pivotally at 18 the upper end of a connecting link 19, the lower end of which is attached pivotally at 20 to the forward end of a rearwardly extending downwardly inclining bar 21 which passes beneath the housing immediately to the side of the quadrant. The rear end of the bar 21 is fitted with a shoe 22.

23 is an adjusting lever secured permanently to the bar 21 in a location adjacent the quadrant and extending upwardly and rearwardly behind the housing. The lever is provided with a hand latch 24 and a bell crank 25, the latch being connected to the bell crank by a rod 26. 27 is a dog or detent slidably mounted within a suitable housing 28 carried by the lever. The dog engages the teeth of the quadrant and is connected to the bell crank by a rod 29 and is held normally engaged with the quadrant by a pressure spring 30 contained within the housing. A hooked retaining bar 31 is permanently attached to the side of the housing and has the hooked end engaging and making sliding contact with the shoulder 13'.

Here it will be observed that the shoe is located somewhat to the rear of the rear wheels and is elevated from the ground so that should the front end of the engine attempt to upset backwardly, such as might occur when going up an incline with a load, the shoe will strike the ground and act to pull down the clutch pedal.

By properly adjusting and proportioning the parts one can arrange it such that the clutch pedal will be automatically pulled down at a set time and before the tractor has tilted to a dangerous position.

Obviously upon the clutch pedal being so operated the motor will go out of action and the over-turning of the tractor will be avoided. The adjustment of the shoe up and down in respect to the ground is accomplished by manipulating the hand latch 24 and setting the detent in a higher or lower position on the quadrant.

While we have entered into the details of construction of the attachment, it will be understood that it could be readily modified without departing from the spirit of the invention which consists in reality in the provision of a controlling lever which will strike the ground prior to the front end of the tractor taking an unsafe tilt and will act to throw the clutch pedal and stop the motor.

In actual practice and under existing conditions, whether loaded or unloaded, there is a safe angle through which the tractor can tilt rearwardly without upsetting while allowing a reasonable factor of safety and this angle we have termed the tilting angle of safety in the accompanying claims.

What we claim as our invention is:—

1. In a tractor, the combination with the clutch controlling pedal and the rear axle housing, of a bar extending rearwardly beneath the housing, a quadrant and detent adjustably connecting the bar to the housing, a shoe at the rear end of the bar and an operating connection between the front end of the bar and the clutch pedal.

2. In a tractor, the combination with the clutch controlling pedal and the rear axle housing, of a band detachably secured to the housing and provided on the underside with a downwardly extending quadrant, a rearwardly extending bar passing to the side of the quadrant, a detent adjustably connecting the bar to the quadrant, a hand latch controlling the detent, a clip detachably connected to the clutch pedal and a link connecting the clip to the forward end of the bar.

3. In a tractor, the combination with the clutch controlling pedal and the rear axle housing, of a band detachably secured to the housing and provided on the underside with a downwardly extending quadrant. a rearwardly extending bar passing to the side of the quadrant, a detent adjustably connecting the bar to the quadrant, a hand latch controlling the detent, a clip detachably connected to the clutch pedal, a link connecting the clip to the forward end of the bar and a striking shoe at the rear end of the bar.

Signed at Coutts, this 30th day of September, 1919.

HARRY LEE JACKSON WATCHORN.
GEORGE HADLEY ROBERTS.
MICHAEL RAKER.

In the presence of—
SIDNEY WETZEL,
R. M. DICKINSON.